Nov. 9, 1943.  I. E. MUSKAT  2,333,948
PREPARATION OF PIGMENTS
Filed April 25, 1941
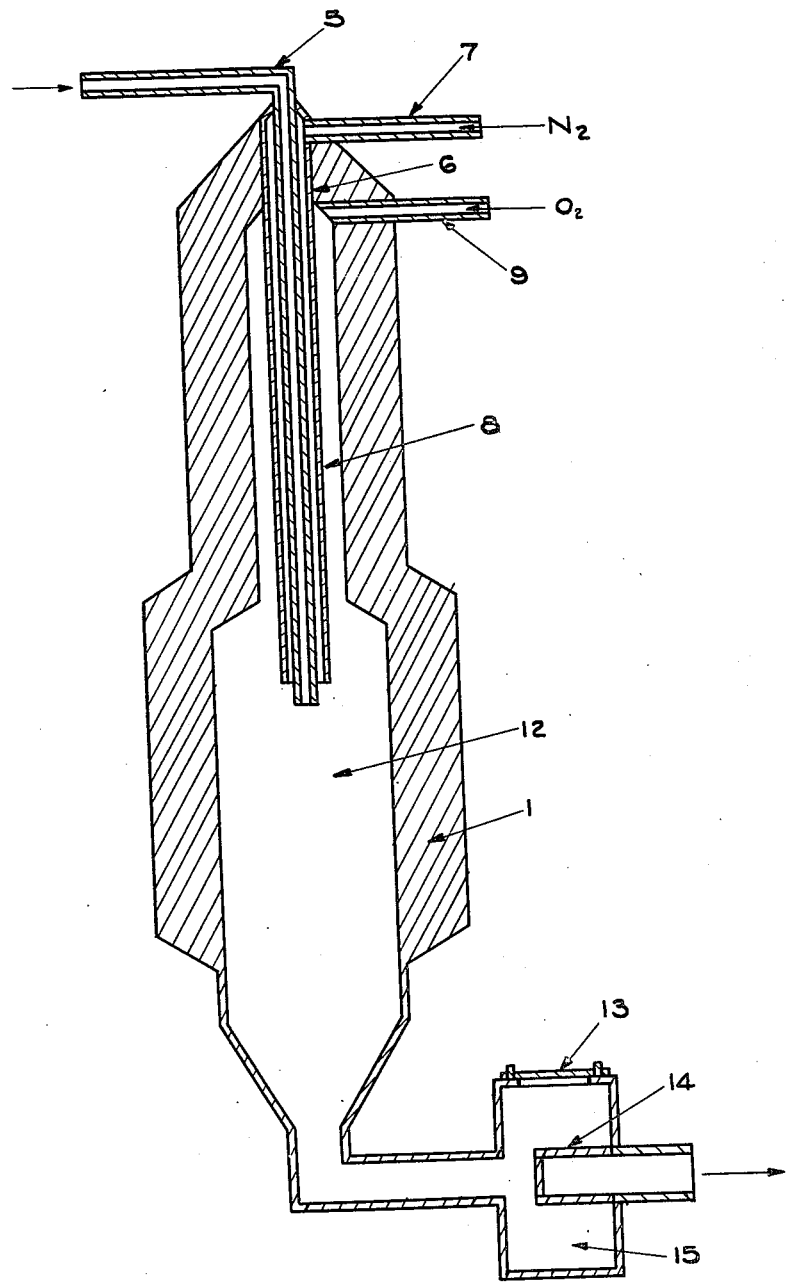
INVENTOR.
IRVING E. MUSKAT
BY
ATTORNEY.

Patented Nov. 9, 1943

2,333,948

UNITED STATES PATENT OFFICE 2,333,948

PREPARATION OF PIGMENTS

Irving E. Muskat, Akron, Ohio, assignor to Pittsburgh Plate Glass Company, Allegheny County, Pa., a corporation of Pennsylvania Application April 25, 1941, Serial No. 390,315

21 Claims. (Cl. 106—296)

This invention relates to the production of finely divided metallic oxides from the corresponding halides and is particularly related to the production of titanium dioxide pigments containing other metallic oxides.

In my prior application for United States Letters Patent, Serial No. 176,647, filed November 26, 1937, issued April 29, 1941, as U. S. Patent No. 2,240,343, of which this application is a continuation-in-part, methods have been described and claimed wherein titanium halides are thermally decomposed under conditions such that crystal formation is substantially minimized. In such application it was pointed out that upon reaction of titanium tetrachloride with oxygen a crystalline form of titanium dioxide which is not useful as a pigment is generally obtained and that this formation of crystalline titanium dioxide may be prevented or substantially minimized by conducting the reaction out of contact with hot surfaces. Accordingly, methods were described whereby the reaction might be conducted in vapor phase and the reaction adjacent hot walls or other hot surfaces within the reaction chamber substantially minimized.

In accordance with the present invention, it has been noted that similar difficulties are encountered in the treatment of other metal halides which are capable of reacting with oxygen or oxygen containing gases to form the corresponding metallic oxides. Thus, when the halides of aluminum, zinc, antimony, zirconium, chromium (including chromic, chromous and chromyl chlorides), cobalt, silicon, beryllium, boron, cadmium, molybdenum, nickel, vanadium, etc., as well as titanium, are converted to the oxides, coarse crystalline materials are frequently produced. By conducting the reaction in vapor phase out of contact with the hot furnace walls or other hot surfaces, a uniform, finely divided oxide may be obtained.

The invention is particularly applicable to the production of mixtures of halides to form blended pigments, preferably titanium dioxide pigments. For example, white pigments may be prepared by thermally decomposing a mixture of titanium tetrachloride and a metallic halide such as zinc chloride, aluminum chloride, or silicon tetrachloride with oxygen containing gases. Similarly, a tinted pigment may be secured by decomposition of a titanium halide in the presence of a chloride of a metal capable of forming a color oxide such as chromic chloride, chromyl chloride, cobalt chloride, vanadium chloride, etc. Likewise, the chlorides of other metals such as lead, bismuth, or antimony chlorides may be decomposed by this means. The incorporation of these agents serves not only to improve or change the color of the titanium dioxide but also acts to produce products of more uniform chalking characteristics, oil absorption, particle size, and to improve various other characteristics of the pigment. In any event, the process should be conducted in a manner such that the thermal decomposition occurs in vapor phase out of contact with hot surfaces within the reaction chamber in order to minimize the formation of seed crystals which promote the formation of the crystalline form of oxide. In order to inhibit formation of crystals at the point of introduction of the metallic halide it is usually desired to maintain a body of inert or non-oxidizing gas adjacent the inlet whereby the incoming halide is introduced into the reaction chamber through this gaseous medium and the inlet itself is maintained out of substantial contact with the oxidizing atmosphere.

This may be done, for example, by introducing vaporized halide through a nozzle, establishing an atmosphere of inert gas therearound and continuously introducing enough inert gas to move a stream of the gas and the vapor from the nozzle into the oxidizing atmosphere. In accordance with another method, the metallic halide in liquid or solid state may be showered through an inert atmosphere and thence into an oxidizing zone. Nitrogen, carbon dioxide, helium or chlorine may be used as an inert gas for this process.

The temperature at which the decomposition is conducted is preferably maintained at about 1400 to 2200° F. While higher temperatures may be used, coarsening of the product generally occurs to an undesirable degree.

The accompanying drawing is a diagrammatic sectional view of an illustrative form of apparatus which is suitable for use in accordance with the present invention. In this embodiment, I provide a vertically arranged furnace 1, which is equipped with a reaction chamber 12, and preheating zone 8. Suitable heating elements (not shown) are provided adjacent the preheating chamber 8, and the furnace may be covered partially or completely with insulation. Vertically disposed, concentrically arranged tubes 5 and 6 extend through the preheating zone and into the reaction space.

In the operation of this device a stream of preheated metallic halide vapor such as a mixture of vaporized titanium tetrachloride and silicon, cobalt, or zinc chlorides, is introduced into tube 5 and nitrogen or other inert gas introduced into tube 6 through inlet tube 7, while a stream of oxygen is admitted at inlet 9. The gases passing through the preheating zone are heated to reaction temperature. Thermal decomposition of the chlorides at the terminal portion of tube 5 is prevented by the fluid envelope of inert gas which is discharged from tube 6, about the end of tube 5, thus preventing an accumulation of oxygen adjacent the metallic chloride jet. The chloride vapor is thus swept into reaction zone 12, of suitable size such that the chloride is decomposed before substantial contact with the hot walls of the chamber can occur. It will thus be apparent that the reaction of chloride and the oxygen is effected in the vapor phase and that the reaction is conducted in a manner such that contact of the chloride adjacent the hot surfaces within the chamber is substantially minimized in order to prevent or minimize formation of crystalline metallic oxides.

It should be understood that the method of preparing metallic oxides as described herein is merely illustrative and that various other methods of decomposing the chloride herein mentioned may be used. For example, the process may be conducted by introducing streams of vaporized titanium tetrahalide or other halide and oxygen or air in opposite directions into a reaction chamber and withdrawing the products of reaction along the halide inlet whereby an envelope of the evolved halogen such as chlorine is formed about the inlet. This process is described in copending application, Serial No. 271,694, filed May 4, 1939, by myself and Alphonse Pechukas.

As a further means of insuring the production of a finely divided product and minimizing formation of crystals, it is generally desirable to maintain the temperature of the walls of the reaction chamber substantially below the temperature of the main reaction zone. Thus, while the temperature in the central portion of the chamber where the major portion of the reaction occurs may be 900 to 1200° C., the temperature of the walls is generally maintained below 850° C. and often 750° C. or below. The reaction zone may be of any convenient size sufficient to prevent decomposition of the halide adjacent the surface thereof. The actual size required varies with the size of the oxygen and metal halide inlets and with the rate of introduction of the reactants, and accordingly, no specific figures may be set forth. Generally speaking, however, if crystals are formed to any substantial degree, the reaction zone should be enlarged.

The exhaust gases containing chlorine and suspended metallic oxides are conveyed to a filter chamber 15, which is provided with a suitable filter 14. This filter may be of any convenient structure such as a plate or tube filter. This filter may comprise porous alundum, porous carborundum, or other resistant porous filter medium. In accordance with a convenient modification, the filter may comprise a plurality of porous aluminum oxide filter candles whereby the gases may be withdrawn through the walls thereof into the interior of the candle and may be subsequently discharged. In such a case the oxides may be collected on the exterior side of the candle. As described in a copending application of Alphonse Pechukas and George Atkinson, Serial No. 386,863, filed April 4, 1941, care should be taken to insure the removal of the oxides from the gases while the temperature of the gases remains above about 250° C. in order to improve the quality and color of the oxide. Heat may be applied to the filtration chamber, if necessary, in order to maintain the temperature at the required value. In order to maintain the process in substantially continuous operation, a plurality of chambers 15, may be provided together with means for changing the flow of the gases containing the oxides from one chamber to another when one chamber has become filled.

When the chamber is so filled or the filter becomes clogged, flow of the suspension to the chamber is discontinued and air, oxygen, or inert gas is introduced in order to remove adsorbed chlorine or other acidic agents. During this treatment the oxide may be maintained at a temperature above about 250° C. and, if desired, it may be subjected to calcination at a temperature of 400° C. to 750° C. before removal from the chamber.

In order to remove the resulting oxides from the filter surface, air or inert gases may be introduced into the chamber in a direction opposite to the flow of the reaction products through the filter. By this means, particles of the oxides which have become embedded in the pores of the filter plate or filter candle are forced off the surface thereof and the filter is thereby cleaned for further use. Thereafter, the oxides may be removed through a suitable outlet, such as outlet 13, provided at the top of the chamber, or, if desired, through a discharge chute provided at the bottom of the chamber. If desired, the calcination may be effected by heating the air or inert gas which is passed through the chamber to a suitable temperature, for example, 750° C. This calcination may be continued until the chlorine and other impurities are driven off. Two hours at 600° C. is found to be suitable for most purposes.

In accordance with a further modification, methods other than filtration may be utilized to remove suspended oxides. For example, they may be precipitated by subjection of the gases to supersonic vibrations such as are obtained from a quartz crystal, or to electrostatic or electromagnetic precipitation.

The amount of other metallic halide used in conjunction with titanium tetrachloride may be varied in accordance with the results desired. In many cases only small quantities, for example, 0.001 to one percent by weight based upon the weight of titanium halide is found necessary. Thus, it is found that such small amounts of compounds such as cobalt chloride, molybdenum chloride, silicon tetrachloride, etc., may materially improve the characteristics (whiteness, particle size, etc.) of titanium dioxide. In other cases, the production of colored pigments are desirable and accordingly, the amount of other metal oxide incorporated will depend upon the color desired. Thus, increased quantities of pigmentary products or halides capable of forming oxides such as chromium, nickel, copper, silicon, zinc, zirconium, aluminum chloride, or other chloride, may be added in somewhat larger quantities to produce a tinted or an extended pigment. In such a case it is desirable to use sufficient titanium tetrachloride to insure the presence of at least 30 percent titanium dioxide in the final pigment. Mixtures of titanium chloride with titanium bromides, fluorides, and iodides may be used as well as halides of other metals. The mixtures of halides may be formed by passing heated vaporized titanium tetrachloride over the other halide at a temperature sufficiently high to vaporize said other halide or the halides may be separately vaporized and mixed.

The decomposition of the halides may be conducted in the presence of added metallic salts other than halides. Thus, cobalt, antimony, chromium, nickel, copper, aluminum, etc., may be added as sulphides, sulphates or other salts. Similarly, the added agent may be introduced as an oxide or in the free metallic state. The decomposition is conducted at temperatures at which the added agent is in vapor state. When a metal or a metallic oxide, sulphide or other non-halide agent is introduced into the reaction zone it may be first halogenated by the free halogen before it contacts the oxygen. In this case it will be converted to the oxide subsequently.

While the invention is particularly applicable to the production of a blended titanium pigment, titanium-free, finely divided metal oxides may be prepared in accordance with the present invention. For example, the individual above-mentioned halides may be decomposed alone or as mixtures to produce various desirable products. In such a case, the reaction temperature may vary considerably with the nature of the halide. Some halides will react with oxygen readily at 100° F. while others may require temperatures in excess of 2500° F. As will be understood by one skilled in the art, the process is especially suitable for the halides of the amphoteric metals, the halides of which are more readily converted to oxides.

The following examples are illustrative:

Example I

An apparatus such as illustrated in the drawing wherein the diameter of the TiCl₄ inlet was ⅛ inch, the diameter of the inert gas inlet ½ inch and the reaction zone 4 inches in diameter was heated to a temperature of 1000° C. A vaporized mixture comprising 98 percent by volume of TiCl₄ and 2 percent by volume of silicon tetrachloride was introduced into the reaction zone at a rate of 10 liters per minute while oxygen was introduced at a rate of 12 liters per minute and nitrogen at a rate of 4 liters per minute. The pigment suspension was withdrawn and filtered at a temperature of 450° C. Upon calcination of the resulting pigment, a white product of fine particle size was secured.

Example II

An apparatus similar to that shown in the drawing was used in which the TiCl₄ inlet was ⅛" in diameter, the inert gas inlet was ½" and the reaction zone was 16" in diameter. This apparatus was heated to 1000° C. and vaporized TiCl₄ containing 0.001 percent cobalt chloride was passed in at the rate of 10 liters per minute, nitrogen at the rate of 4 liters per minute and air at the rate of 60 liters per minute. The TiO₂ pigment produced was withdrawn and filtered while hot. Upon calcination at 600° C., a white product having a blue undertone and having excellent pigmentary properties was obtained.

Example III

An apparatus as described in application Serial No. 271,694, filed May 4, 1939, was used having a reaction zone 14 inches in diameter. Air was passed to the reaction zone at a rate of 70 liters per minute. TiCl₄ vapor was introduced in countercurrent direction with respect to the air through a tube ⅝ inch in internal diameter at a rate of 12 liters per minute. The temperature was maintained at 1800° F. The titanium dioxide, chlorine, and residual components of the air were withdrawn to a settling chamber where the TiO₂ was recovered. After continuous operation for 5¼ hours, a yield of 96 percent was obtained. The pigment was uniformly fine in texture.

Example IV

The process described in Example III was repeated using a reaction zone having an internal diameter of 4 inches through which air was introduced at a rate of 28 liters per minute. The titanium tetrachloride was introduced through a tube having a diameter of 0.5 inch at a rate of 30 grams per minute. The temperature was maintained at 1800° F., through the duration of the reaction. The product was very fine and possessed a good color. The amount of coarse crystals formed was below 0.5 percent of the total TiO₂ formed.

Example V

The apparatus described in Example I was used to decompose aluminum chloride. Aluminum chloride vapor at a temperature of 300° C. was passed into the reaction chamber at a rate of 8–9 liters per minute. Oxygen was passed in at the rate of 10 liters per minute, and nitrogen was added through the inert gas jet at the rate of 3 liters per minute, and the temperature within the reaction zone was maintained at 900 to 950° C. The aluminum oxide was collected in the settling chamber and was calcined for one hour at 500° C. in the presence of oxygen to remove traces of chlorine.

Example VI

The apparatus described in Example II was used to prepare a pigmentary zinc oxide containing substantial quantities of silicon dioxide. A vaporized stream of zinc chloride which contained about 15 percent silicon tetrachloride was passed into the reaction chamber at the rate of 8 liters per minute. The reaction vessel was maintained at 900° F. Air was introduced at the rate of 65 liters per minute and chlorine was passed in through the inert gas jet at the rate of 2 liters per minute. A finely divided oxide composition was collected in the settling chamber.

Example VII

The apparatus described in Example II was used to prepare zirconium dioxide. A stream of vaporized zirconium tetrafluoride was passed to the reaction chamber at a rate of 5 liters per minute. Nitrogen was introduced at the rate of 5 liters per minute through the inert gas jet, and air was introduced at the rate of 75 liters per minute. The reaction vessel was maintained at 800° C. throughout the reaction. The resulting zirconium dioxide was of uniformly fine texture and color.

Example VIII

The apparatus described in Example I was used to prepare finely divided chromium oxide (Cr₂O₃). Chromic chloride was passed into the reaction chamber at the rate of 8 liters per hour. Carbon dioxide was added through the inert gas jet at the rate of 4 liters per hour and oxygen was introduced at the rate of 10 liters per minute. The reaction vessel was maintained at 1000° C. throughout the reaction, and a finely divided chromic oxide was collected.

Although the present invention has been described in connection with the details of certain embodiments thereof, it is not intended that such details shall be considered as limitations upon the invention except insofar as included in the accompanying claims. This invention is a continuation-in-part of application Serial No. 176,647, filed November 26, 1937, issued April 29, 1941, as U. S. Patent No. 2,240,343.

I claim:

1. The method of producing a finely divided pigment which comprises reacting oxygen with a vaporized titanium halide and a halide of another metal capable of reacting with oxygen and minimizing crystal formation by maintaining the halides out of substantial contact with hot surfaces within the reaction zone during the major portion of said decomposition.

2. The method of producing a finely divided pigment which comprises reacting oxygen with vaporized titanium tetrachloride and a chloride of another metal capable of reacting with oxygen and minimizing crystal formation by maintaining the chloride vapors out of substantial contact with hot surfaces within the reaction zone during the major portion of said decomposition.

3. The method of producing a finely divided pigment which comprises reacting oxygen with vaporized titanium tetrachloride and a chloride of another metal capable of reacting with oxygen at a temperature of 1400 to 2200° F. with oxygen and minimizing crystal formation by maintaining the chloride vapors out of substantial contact with hot surfaces within the reaction zone during the major portion of said decomposition.

4. In the process of producing a titanium dioxide containing pigment by reaction of oxygen with a titanium halide and a halide of another metal capable of reacting with oxygen in gas suspension the step which comprises introducing the said halides into the reaction zone through a nonoxidizing gas.

5. A method of producing a titanium dioxide containing pigment which comprises introducing oxygen into one portion of a reaction chamber, introducing titanium tetrachloride and a chloride of another metal capable of reacting with oxygen into a second portion of the chamber and maintaining a body of nonoxidizing gas in said second portion adjacent the chloride inlet whereby substantial decomposition of the chlorides at the inlet is minimized and reacting said oxygen with said chlorides.

6. In the process of producing a titanium dioxide containing pigment by reaction of oxygen with titanium tetrachloride and a chloride of another metal capable of reacting with oxygen in gas suspension the step which comprises introducing the said chlorides into the reaction zone through a nonoxidizing gas.

7. A method of preparing a titanium dioxide containing pigment which comprises introducing titanium tetrachloride and a halide of another metal capable of reacting with oxygen into a reaction chamber and minimizing crystal formation by thermally decomposing said chlorides by means of oxygen before substantial contact of the chlorides with hot surfaces within the chamber can occur.

8. The method of preparing titanium dioxide which comprises introducing titanium tetrachloride, another metallic chloride which is capable of reacting with oxygen, and oxygen into a reaction chamber, maintaining the temperature sufficiently high to decompose the chlorides, preventing decomposition of the chlorides and consequent formation of large crystals adjacent the chloride inlet by maintaining a body of a gas which is substantially unreactive to the chloride adjacent said inlet and thermally decomposing said chlorides before substantial contact of the chlorides with hot surfaces can occur.

9. As an improvement in the process of preparing a pigment by thermally decomposing vaporized titanium tetrahalide and a halide of another metal which is capable of reacting with oxygen at high temperatures, while maintaining crystal formation by preventing thermal decomposition of the halides adjacent hot surfaces, the step which comprises introducing the halides into a reaction chamber and preventing substantial decomposition thereof adjacent the halide inlet by maintaining the atmosphere adjacent said inlet substantially free of oxygen.

10. The method of producing titanium dioxide suitable for use as a pigment while minimizing crystal formation which comprises subjecting vaporized titanium tetrachloride and a chloride of another metal which is capable of reacting with oxygen to thermal decomposition within a reaction chamber by means of oxygen at a temperature not substantially below 1500° F. and minimizing crystal formation by conducting the decomposition out of substantial contact with hot surfaces within the reaction chamber.

11. In the process of producing a metal oxide by reaction of oxygen with a metallic chloride which is capable of reacting with oxygen in gas suspension, the step which comprises introducing the vaporized chloride into the reaction zone through a nonoxidizing gas.

12. The method of producing finely divided oxides of amphoteric metals which comprises reacting a vaporized halide of a metal capable of forming an amphoteric hydroxide with oxygen and minimizing crystal formation by maintaining the halide out of substantial contact with the hot surfaces of the reaction chamber during the major portion of said decomposition.

13. The method of producing a finely divided metal oxide which comprises reacting oxygen with a vaporized metallic halide which is capable of reacting with oxygen and minimizing crystal formation by maintaining the halide vapor out of substantial contact with hot surfaces within the reaction zone during the major portion of said decomposition.

14. In the process of producing a metal oxide by reaction of a metallic halide which is capable of reacting with oxygen in gas suspension, the step which comprises introducing the vaporized halide into the reaction zone through a nonoxidizing gas.

15. A method of producing a finely divided metal oxide which comprises introducing oxygen into one portion of a reaction chamber, introducing a metallic halide which is capable of reacting with oxygen into a second portion of the chamber and maintaining a body of nonoxidizing gas in said second portion of the chamber adjacent the halide inlet whereby substantial decomposition of the halide at the inlet is avoided and reacting the oxygen with the halide.

16. The method of producing finely divided metallic oxides which comprises reacting oxygen with a vaporized mixture of metallic halides capable of reacting with oxygen and minimizing the formation of crystals by maintaining the halide vapor out of substantial contact with the hot surfaces within the reaction zone during the major part of the decomposition.

17. A method of producing a finely divided oxide composition which comprises introducing oxygen into one portion of a reaction chamber, introducing a mixture of a halide of a metal capable of forming an amphoteric hydroxide and a halide of another amphoteric metal into a second portion of the chamber and maintaining a body of nonoxidizing gas in said second portion adjacent the halide inlet whereby substantial decomposition of the halide at the inlet is avoided.

18. The method of producing a finely divided oxide composition which comprises subjecting a vaporized halide of an amphoteric metal, containing a substantial proportion of a halide of another metal capable of forming an amphoteric hydroxide, to thermal decomposition within a reaction chamber in the presence of oxygen at a temperature sufficiently high to permit rapid and substantially complete conversion of the halides to oxides, and minimizing crystal formation by conducting the decomposition out of substantial contact with hot surfaces within the reaction chamber.

19. The method of producing a finely divided titanium oxide pigment which comprises treating vaporized titanium tetrachloride containing a halide of a metal of the group consisting of chromium, silicon, aluminum, zirconium, antimony, zinc, beryllium, boron, cadmium, cobalt, molybdenum, nickel and vanadium with oxygen at an elevated temperature and maintaining the halides out of substantial contact with the hot surfaces of the reaction chamber.

20. The method of producing finely divided oxides of metals of the group consisting of chromium, silicon, aluminum, zirconium, antimony, zinc, beryllium, boron, cadmium, cobalt, molybdenum, nickel, and vanadium which comprises reacting a vaporized halide of a metal of said group with oxygen while maintaining the halide out of substantial contact with the hot surfaces of the reaction chamber.

21. The process of claim 13 wherein the halide is a chloride of chromium.

IRVING E. MUSKAT.